United States Patent [19]

Lee

[11] Patent Number: 5,004,881
[45] Date of Patent: Apr. 2, 1991

[54] METHOD AND CIRCUIT FOR CONTROLLING POWER LEVEL IN THE ELECTROMAGNETIC INDUCTION COOKER

[75] Inventor: Min Ki Lee, Changwon, Rep. of Korea

[73] Assignee: Goldstar Co., Ltd., Seoul, Rep. of Korea

[21] Appl. No.: 440,264

[22] Filed: Nov. 22, 1989

[51] Int. Cl.$^5$ ............................................. H05B 6/06
[52] U.S. Cl. ...........:.................. 219/10.77; 219/10.493; 219/492; 219/10.41
[58] Field of Search ............ 219/10.77, 10.75, 10.491, 219/10.493, 10.55 B, 492, 10.41

[56] References Cited

U.S. PATENT DOCUMENTS

| | | | |
|---|---|---|---|
| 4,467,165 | 8/1984 | Kiuchi et al. | 219/10.77 |
| 4,507,531 | 3/1985 | Teich et al. | 219/10.55 B |
| 4,511,781 | 4/1985 | Tucker et al. | 219/10.77 |
| 4,555,608 | 11/1985 | Mizukawa et al. | 219/10.77 |
| 4,617,442 | 10/1986 | Okuda | 219/10.77 |
| 4,686,340 | 8/1987 | Fukasawa | 219/10.77 |
| 4,757,176 | 7/1988 | Suzuki et al. | 219/10.77 |
| 4,764,652 | 8/1988 | Lee | 219/10.77 |
| 4,810,847 | 3/1989 | Ito | 219/10.77 |

Primary Examiner—Philip H. Leung

[57] ABSTRACT

A method and circuit controls the power level in an EI cooker by using a combination of time duty ratio control and pulse width modulation control depending upon the power level established by the user. When the power level is low, the turning on and off of the power transistor is controlled by the time duty ratio control method. When the power level is high, the turning on and off of the power transistor is controlled by the pulse width modulation control method.

4 Claims, 3 Drawing Sheets

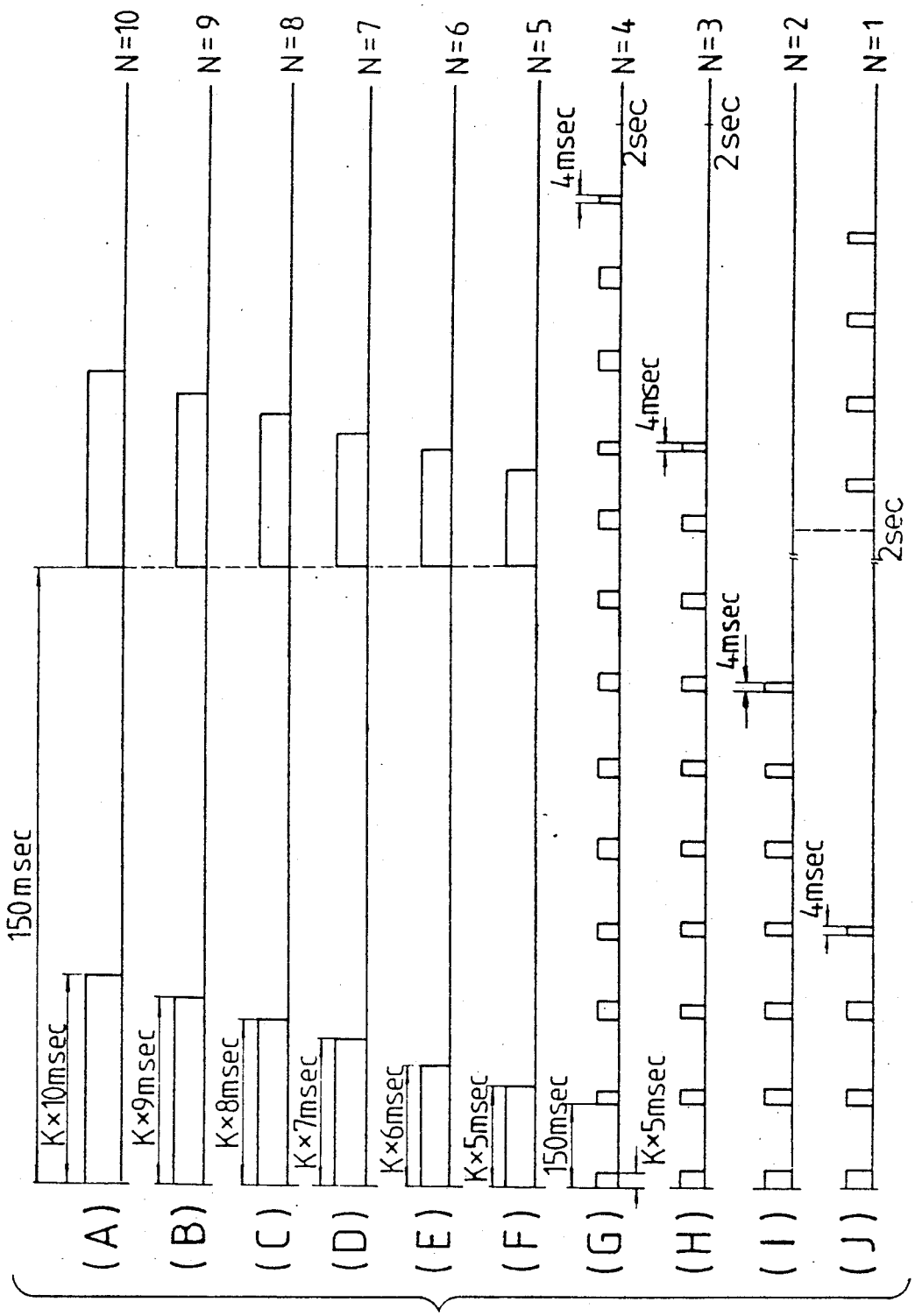

METHOD AND CIRCUIT FOR CONTROLLING POWER LEVEL IN THE ELECTROMAGNETIC INDUCTION COOKER

BACKGROUND OF THE INVENTION

The present invention is related to a method and apparatus for controlling the power level in the electromagnetic induction (EI) cooker which requires that the direction of current flow in the working coil is alternated by making the power transistor of an inverter turned on-off. The magnetic field generated in the working coil is alternated by the alternating direction of the current flow in the working coil. By controlling the pulse width modulation and the time duty ratio in combination a certain power level can be established by user.

To control the power level in electromagnetic induction (EI) cooker in the prior art, the time duty ratio was control fed to alternate the power level. By controlling the time duty ratio, the power transistor was turned on-off during the settled limited time at the power level to produce maximum output power of EI cooker. A pulse width modulation control method to control the power level by controlling the turn-on time of power transistor with the width of pulse signal during a limited time.

However, when using the time duty ratio control method, low output is available. The power level is controlled easily when the output is low and beat noise caused by the differences in frequencies are not produced in multi-burner type EI cooker having many working coils because the frequency to turn the power transistor turned "on-off" is constant. On the other hand, flickering can occur by changing the load current at the on-off duration of power transistor and the stable operation of EI cooker can not be obtained because of this transient phenomena.

When using the pulse width modulation control method, power can be obtained continuously and the power level can be kept uniformly. On the other hand, detection of the input current is difficult because the load current is small when the power level is less than 200 W, and the differences in frequencies causes serious beat noise when the power levels are in the respectively different multi-burner type EI cooker.

BRIEF DESCRIPTION OF THE DRAWINGS

These and other objects and advantages of the present invention will become clear from the following description with reference to the accompanying drawings wherein:

FIG. 3 (A)–(J) are the waveforms of pulse signals offered as output from a microcomputer according to an established power level using the control method of the present invention.

Figure 1:
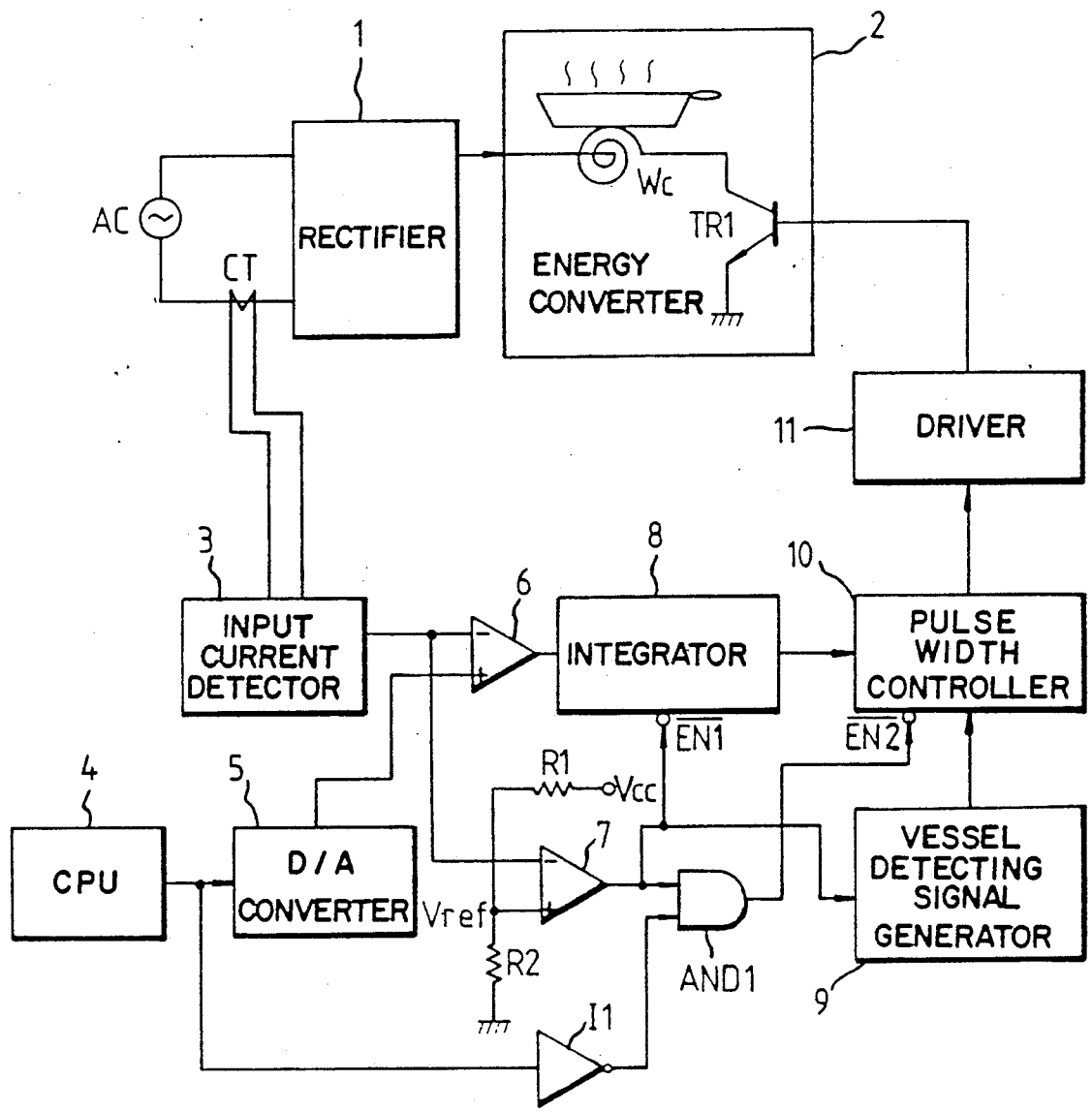
FIG. 1 is a circuit diagram of an EI cooker using the control method according to this the present invention.

The numberals means in the drawings as follows 1. rectifier
2. energy converter
3. input current detector
4. microcomputer
5. digital to analog (D/A) converter -continued 6,7. comparator
8. integrator
9. vessel detecting signal generator
10. pulse width controller
11. driver
CT. current transformer
TR1. power transistor
WC. working coil
I1. inverter
R1, R2. resistor

THE PURPOSE OF THIS INVENTION

The present invention is provided to overcome the defects in the prior art method and circuit for controlling power level in an EI cooker. The present invention is related a the method and circuit for controlling the power level in EI cooker with a combination of time duty ratio control and pulse width modulation control according to the power level established by the user. For example, if the maximum power level is 10, when the power level is 1–4, the power transistor is turned "on-off" by a time duty ratio control method, and when the power level is 5–10, the power transistor is turned "on-off" by the pulse width modulation control method.

DETAILED DESCRIPTION OF THIS INVENTION

This invention will be described below in detail according to the drawings.

FIG. 1 is the circuit diagram of EI cooker using the control method of the present invention. The circuit for controlling the power level in the cooker includes an input current detector (3) for detecting current flowing in a working coil (WC) through rectifier (1) by detecting the current in current transformer (CT). The flow of current is related to the turning on-off of a power transistor (TR1) of energy converter (2). A microcomputer (4) outputs pulse signals to indicate the pulse width modulation control method or the time duty ratio control method to be used according to the power level established by the user. An A/D converter (5) transforms the output pulse signals of the microcomputer (4) into analog signals. A comparator (6) compares the output voltage of the input current detector (3) with the output voltage of the A/D converter (5), and 1 comparator (7) compares the output voltage of the input current detector (3) with a reference voltage which is established by dividing a Vcc voltage using reistors (R1, R2). An integrator (8) is enabled according to an output signal of the the comparator (7) to integrate the output signal of the the comparator (6). A vessel detecting signal generator (9) output a vessel detecting signal according to the output signal of the the comparator (7). An inverter (I1) reverses the output signal of the microcomputer (4). AND gate (AND1) logically ANDS the output signals of the the comparator (7) and inverter (I1). A pulse width controller (10) is enabled by the output signal of the AND gate (AND1) and outputs a pulse signal according to the output signal of the the integrator (8) and vessel detecting signal generator (9). A driver (I1) causes the power transistor (TR1) to turn "on-off" according to the output signal of the pulse width controller (10).

The control method according to the present invention will be described with flow chart of FIG. 2 and wave form diagram of FIG. 3.

In the initial status before the user starts the operation of EI cooker, the power transistor (TR1) is turned "off", and comparator (7) outputs a high voltage according to the reference voltage (Vref) applied to the non-reversed input terminal (+) of the comparator (7) because the input current detector (3) outputs a low voltage for lack of input. The high voltage is applied to the enable terminal ($\overline{EN1}$) of the integrator (8) to disable the integrator (8), and the high voltage is applied to the vessel detecting signal generator (9) to produce the vessel detecting signal. The microcomputer (4) outputs a low voltage, after the low voltage is inverted into the high voltage through the inverter (I1), the inverted high voltage outputted from comparator (7) is applied to AND gate (AND1) together with the output from comparator 7. The high voltage is outputted from the AND gate (AND1) and applied to the enable terminal ($\overline{EN1}$) of the pulse width controller (10).

Accordingly, the pulse width controller (10) is disabled to output low voltage without reference to the output signal of integrator (8) and vessel detecting signal generator (9). The driver (11) does not cause the power transistor (TR1) turned on.

Figure 2:
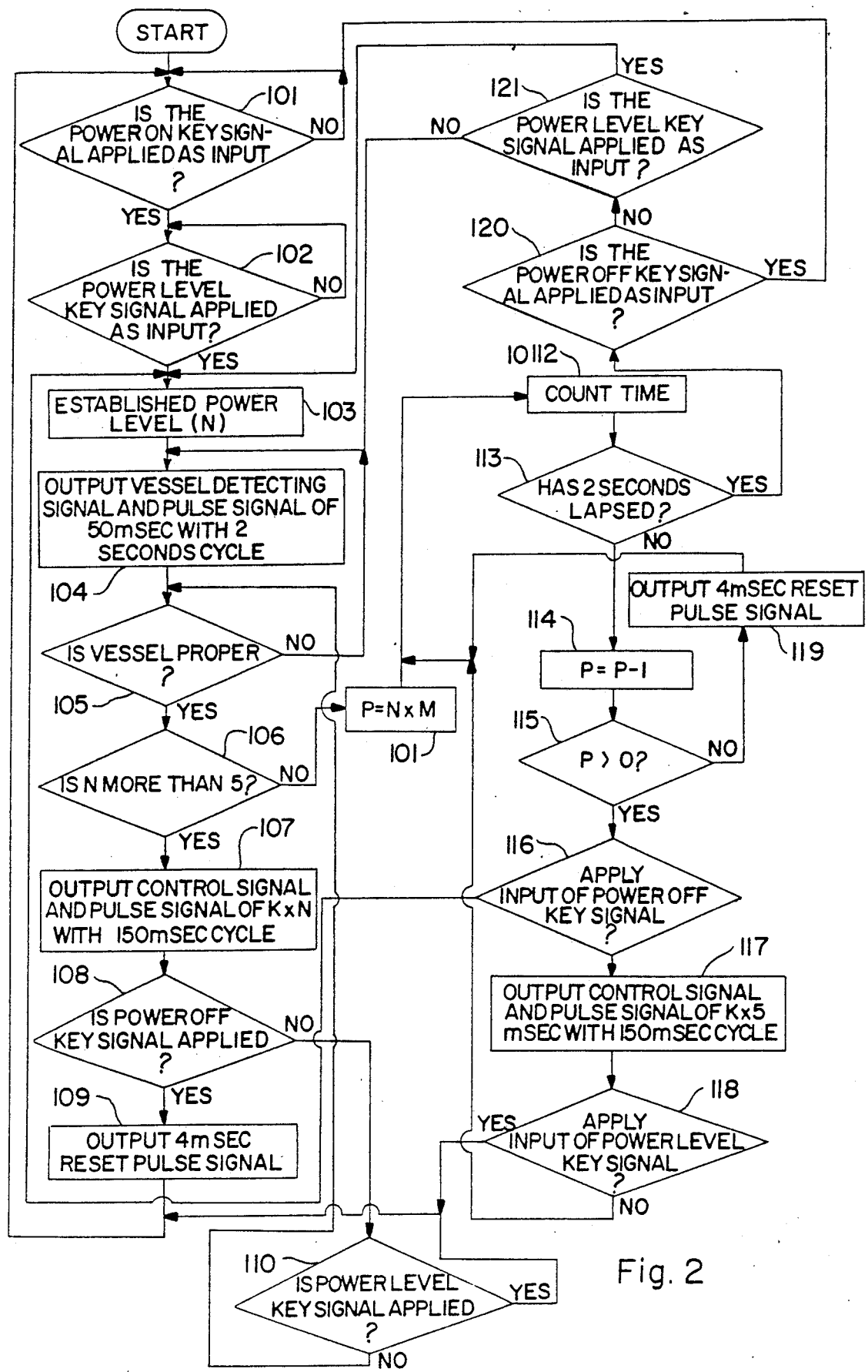
FIG. 2 is a flow chart of the control method of the present invention.

When the user operates the EI cooker as shown in FIG. 2, the power on key signal is applied as an input to the microcomputer (4) at step (101). If the power level key signal is applied to the microcomputer (4), at step (102) the microcomputer determines which power level key has been applied and establishes the power level (N) accordingly at step (103). Then, vessel detecting signal, i.e., pulse signal of 50 msec is outputted with 2 second cycle at step (104).

As described in the above, if the microcomputer (4) outputs the pulse signal, the pulse signal is inverted by the inverter (I1) and applied to the AND gate (AND1). The AND gate (AND1) outputs a low voltage to cause the pulse width controller (10) to be enabled. Consequently, the pulse width controller (10) outputs a pulse signal to be applied to the driver (11) according to the vessel detecting signal outputted from the vessel detecting signal generator (9) the driver (11) causes the power transistor (TR1) to turn "on", thereby allowing current to flow in the working coil (WC).

The current transformer (CT) detects the current flowing in the working coil (WC) and the input current detector (3) outputs a voltage corresponding to the input current. If the input current is at the proper level, the comparator (7) offers output of the low voltage to make the integrator (8) to be enabled, and the pulse width controller (10) is continuously enabled at the same time.

The microcomputer (4) determines whether the cooking vessel is proper or not at step (104). This step (104) is repeated to determine whether the vessel is proper. If the vessel is proper, the microcomputer (4) determines whether the power level (N) is more than 5 at step (106).

Assuming that the power level is 10, the microcomputer outputs a pulse signal having a time width of time variable (K) multiplied by the power level (N), i.e., K × 10 msec is the time width. At step (107), the outputted pulse signal is transformed into an analog signal by D/A converter (5) and then the analog signal is applied to the comparator (6) so the output of the comparator (6) becomes high.

The outputted high voltage is integrated by the integrator (8) and modified by the pulse width controller (10) before being applied to the driver (11). The driver (11) causes the power transistor (TR1) turned "on-off" which alternates the direction of current flowing in the working coil (WC) according to the power level (N), 10.

The microcomputer (4) determines whether the power off key signal is applied. If the power off key signal is applied as input, a reset pulse signal of 4 msec is outputted to stop the operation of EI cooker at step (110). If the power off key signal is not applied as input, it is determined whether the power level key signal has been applied at step (110).

When the power level key signal is not applied, the procedure from step (105) is repeated again to alternate the direction of current flowing in the working coil (WC). When the power level key signal is applied, the procedure from step (103) is repeated again. When the power level (N) is 9-5, the microcomputer (4) outputs a pulse signal of K×N msec with the cycle of 150 msec according to the power level (N) established as shown in FIG. 3 (B)-(F) to alternate the direction of current flowing in the working coil (WC).

On the other hand, when the power level (N) is less than 4, the number (P) of pulse signals outputted is calculated at step (111) by multiplying the variable (M) by power level (N). At step (112) time (t) is counted. At step (113) it is determined whether two seconds has lapsed. If two seconds have not lapsed, the number (P) of pulse signals is subtracted at step (114). At step (115) it is determined whether the number (P) of pulse signals left is 0. When the number (P) of pulse signals is not 0, a pulse signal having a width K×5 msec is outputted with a cycle of 150 msec at step (117) as shown in FIG. 3 (G)-(J).

At step (118) it is determined whether the power level key signal is applied. When the power level key is applied as input, the procedure from step (103) is repeated. When the power level key is not applied as input, the procedure from step (112) is repeated, and the pulse signals of K×5 msec with the cycle of 150 msec is offered as output repeatedly to alternate the direction of current flowing in the working coil (WC).

When the number (P) of pulse signals left at step (115) becomes 0 a reset pulse signal of 4 msec is outputted at step (119), and the step (112) is repeated. At step (113) if two seconds have lapsed and the power off key signal is applied as input after, discriminating whether the operation is stopped.

When the power off key signal is not applied as input, it is determined whether the power level key signal is applied as input. If the power level key signal is applied as input, the procedure from step (103) is repeated, or if the power level key signal is not applied as input, the procedure from step (104) is repeated to alternate the direction of current flowing in working coil (WC).

As described in the above, the circuit and method for controlling power level in the electromagnetic induction cooker according to this invention is to turn the power transistor "on-off" by the use of pulse width modulation control method when the established power level is low. This allows easy control of the low output and reduces the flickering phenomena of electric lights, beat noise caused by differences in frequency, and substantially eliminates transient phenomena, thereby allowing operation to be performed smoothly.

While there has been described what is at present considered to be preferred embodiment of the invention, it will be understood that various modifications may be made therein, and it is intended to cover in the appended claims all such modifications as fall within the true spirit and scope of the invention.

What is claimed is:

1. A method of controlling a power level of an EI cooker by turning a power transistor off and on to alternate a direction of current flowing in a working coil, the power transistor being turned on and off according to pulse signals received from a central processing unit, comprising the steps of:
   (a) establishing a power level for the EI cooker;
   (b) determining if the established power level is greater than or equal to a predetermined power level;
   (c) controlling a pulse width of the pulse signals from the central processing unit by multiplying a variable (K) with the established power level repeatedly when said step (b) determines that the established power level is greater than or equal to the predetermined power level; and
   (d) controlling a duty cycle of the pulse signals from the central processing unit by multiplying variables (M) with the established power level thereby generating pulse signals with a certain duty cycle according to the multiplication of variables (M) with the established power level when said step (b) determines that the established power level is less than the predetermined power level.

2. The method as claimed in claim 1, wherein the EI cooker has at least 10 discrete power levels and the predetermined power level is 5.

3. A device for controlling a power level of an EI cooker comprising:
   establishing means for establishing a power level for the EI cooker;
   determining means, operatively connected to said establishing means, for determining if the established power level is greater than or equal to a predetermined power level;
   driver means for supplying an amount of energy to the EI cooker;
   pulse width control means, operatively connected to said determining means and said driver means, for controlling said driver means to regulate the supply of energy to the EI cooker according to a pulse width modulation method when said determining means determines that the established power level is greater or equal to said predetermined power level; and
   duty cycle control means, operatively connected to said determining means and said driver means, for controlling said driver means to regulate the supply of energy to the EI cooker according to a duty cycle method when said determining means determines that the established power level is less than said predetermined power level.

4. The method as claimed in claim 3, wherein the EI cooker has at least 10 discrete power levels and the predetermined power level is 5.

* * * * *